US00H002163H

(19) United States
(12) Statutory Invention Registration
Mulhern

(10) Reg. No.: US H2163 H
(43) Published: Aug. 1, 2006

(54) GUIDED THRUST MANEUVERED SHIPBOARD CRANE

(75) Inventor: Francis M. Mulhern, Riverton, NJ (US)

(73) Assignee: The United States of America as represented by the Secretary of the Navy, Washington, DC (US)

(21) Appl. No.: 10/738,077

(22) Filed: Dec. 18, 2003

(51) Int. Cl.
*B66C 1/00* (2006.01)

(52) U.S. Cl. ..... 294/66.2; 294/907; 901/45

(58) Field of Classification Search ..... None
See application file for complete search history.

(56) References Cited

U.S. PATENT DOCUMENTS 2,736,600 A * 2/1956 Carlson ..... 294/88
2,986,750 A * 6/1961 Herreshoff ..... 114/368
3,336,572 A * 8/1967 Paull et al. ..... 367/117
3,547,189 A * 12/1970 Bielstein et al. ..... 166/368
3,955,522 A * 5/1976 Gaudiano et al. ..... 114/259
4,214,842 A * 7/1980 Franks ..... 405/191
4,327,784 A * 5/1982 Denniston ..... 141/387
5,120,099 A * 6/1992 Fletcher ..... 294/66.1
5,318,384 A * 6/1994 Maloberti et al. ..... 405/173
6,669,145 B1 * 12/2003 Green ..... 244/135 A

* cited by examiner

*Primary Examiner*—Daniel Pihulic
(74) *Attorney, Agent, or Firm*—Jacob Shuster

(57) ABSTRACT

A floating object is attached to a shipboard hoisting crane through its attachment device under high seawave conditions, by maintaining alignment of the crane attachment device under maneuvering thrust control with a location on the floating object during lowering of the attachment device onto the floating object. Such maneuvering thrust control is established by thrust jets emitted from the attachment device under control of optical scanning detection cells mounted on the attachment device for reception of a reception location indicating beam emitted from the floating object.

6 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

GUIDED THRUST MANEUVERED SHIPBOARD CRANE

STATEMENT OF GOVERNMENT INTEREST

The invention described herein may be manufactured and used by or for the Government of the United States of America for governmental purposes without the payment of any royalties thereon or therefore.

The present invention relates to establishing and maintaining alignment between a shipboard crane and a floating object under rough seawater conditions for crane retrieval of such floating object from the seawater.

BACKGROUND OF THE INVENTION

Objects or vehicles floating on seawater, such as small boats, are currently retrieved onto ships by use of a shipboard crane through which a hook or attachment device is lowered into engagement with the floating object under crane operator control. However under rough seawater conditions, such seawater retrieval of the floating object by use of the crane is very difficult and often unsuccessful because of ship motions and the relative motions between the floating object and the ship crane hook under high sea wave and wind conditions. Under such rough seawater conditions, current practice sometimes involves use of personnel to maneuver the floating object such as a small boat in an effort to compensate for its motions relative to the shipboard crane and/or to manually seize the crane suspended hook and attach it to the small boat to be retrieved. Where the floating object to be retrieved is unmanned, such as a floating buoy or robotic vehicle, it is extremely difficult and time consuming to engage the crane hook with the floating object under high sea states.

It is therefore an important object of the present invention to provide conventional shipboard cranes with facilities which avoid the difficulties and problem heretofore experienced therewith in retrieving unmanned floating objects alongside of a retrieval ship under rough sea conditions.

SUMMARY OF THE INVENTION

In accordance with the present invention, a commercially available type of shipboard crane is utilized to position and lower an attachment hook device onto an unmanned object floating on a body of seawater alongside of a retrieval ship for example on which the crane is mounted. Pursuant to the present invention, such attachment hook device suspended by a cable from the crane at a location above the seawater is equipped with pressurized fluid reaction jet thrusters to maneuver it relative to the crane suspension cable so as to maintain it in alignment with the floating object while being lowered into engagement therewith. The thrusters are automatically controlled for such purpose by an optical homing system, involving an array of photoelectric cells through which to track an optical beacon, flashing at a specific frequency from a beacon emitter on the floating object, to thereby provide location indicating signals to be received by the photoelectric cells for control of the thrusters.

According to certain embodiments of the present invention, the crane suspended attachment device will have a spike-shaped projection to be received within a funnel-shaped, self-aligning attachment device on the floating object to maintain latched attachment after insertion of the crane suspended spike projection. The floating object may then be lifted out of the water and deposited on-board the retrieval ship in the same manner associated with conventional shipboard cranes performing such function. As a result of the foregoing referred to features of the present invention, the crane operator may quickly attach and retrieve floating objects under high sea state conditions.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
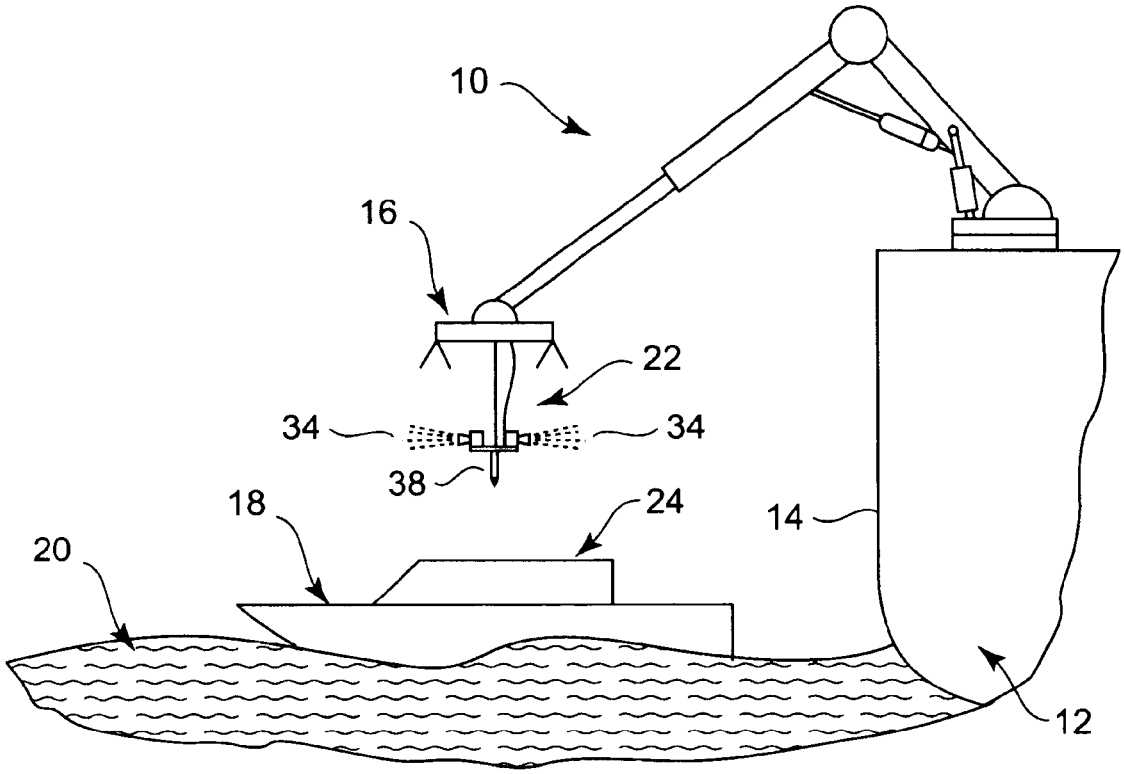
FIG. 1 is a partial side elevation view illustrating a small unmanned floating boat along side of a retrieval ship from which a hoisting crane lowers an attachment device suspended therefrom onto the floating boat.

Referring now to the drawing in detail, FIG. 1 illustrates a shipboard crane 10 of a conventional type generally known in the art, with which the present invention is associated. Such crane 10 is shown mounted on the deck of a marine vessel 12 adjacent to its stern end 14. A load pick-up and delivery end section 16 of the crane 10 is shown overlying an object such as a small, unmanned boat 18 afloat on the seawater 20 adjacent the stern end 14 of the vessel 12. Such end section 16 of the crane 10 is lowered and lifted, under selectively powered control, relative to the boat 18 for load pick-up and delivery as generally known in the art. However pursuant to the present invention, an attachment device 22 is suspended from the crane end section 16, above the seawater 12 for reception within a receptacle formation 24 on the boat 18 above the seawater 12.

Figure 2:
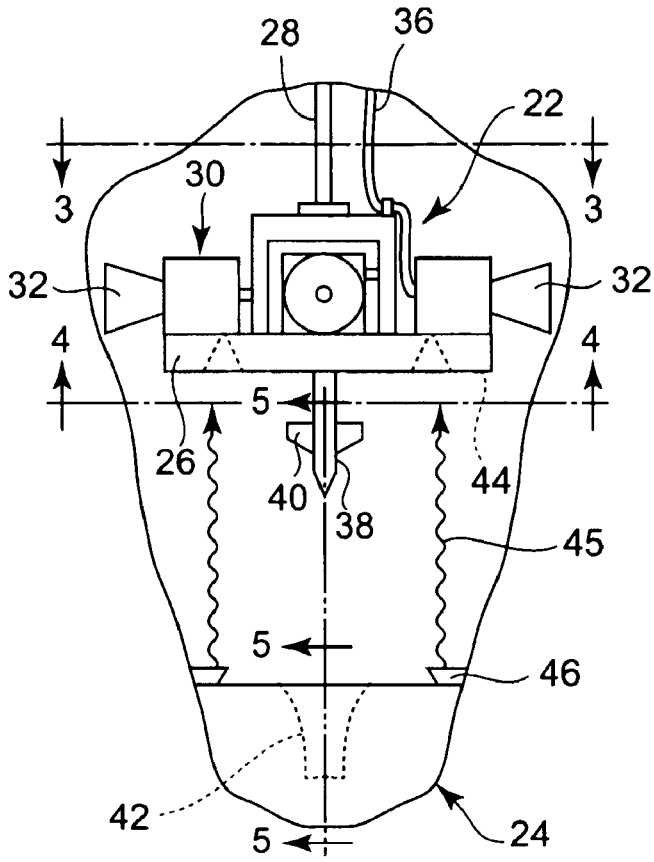
FIG. 2 is a partial front elevation view of the suspended attachment device and attachment receptacle portion of the floating boat shown in FIG. 1.
Figure 3:
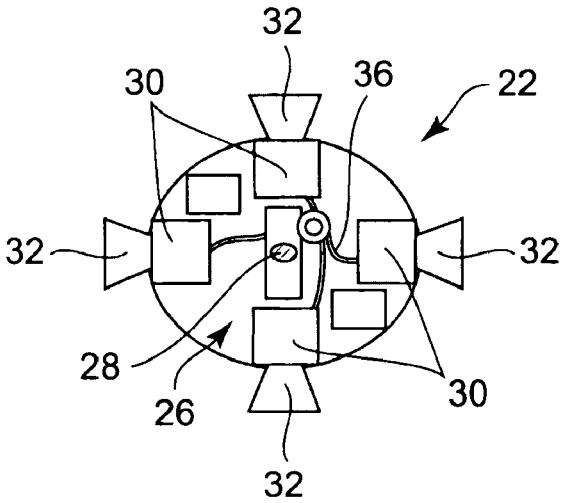
FIGS. 3 and 4 are section views taken substantially through planes 3—3 and 4—4 in FIG. 2.

As shown in FIGS. 2–6, the crane attachment device 22 includes a support 26 suspended from the crane end section 16 by a hoisting cable 28. Positioned on top of the support 26 in 90° angular relation to each other are four (4) thrust control valves 30 to which fluid jet emitting cones 32 are respectively attached as shown in FIG. 2. Pressurized fluid such as water or air supplied to the control valves 30 is discharged as thrust producing jets 34 from the cones 32 as shown in FIG. 1. Such thrust producing jets 34 will accordingly impart motion to the attachment device 22 in different directions while it is being lowered by the crane 10 toward the receptacle 24 on the boat 18 for establishing and maintaining alignment between the attachment device 22 and the receptacle 24. The pressurized fluid for generating the thrust is supplied to the thrust control valves 30 through flexible tubing 36 as shown in FIGS. 2 and 3.

Figure 4:
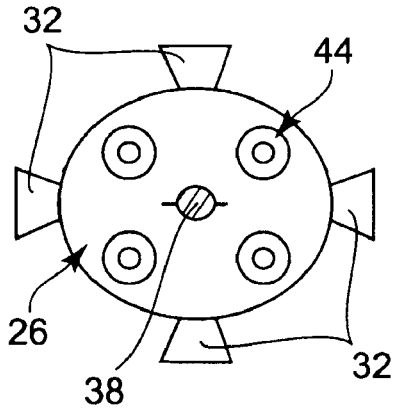
Figure 6:
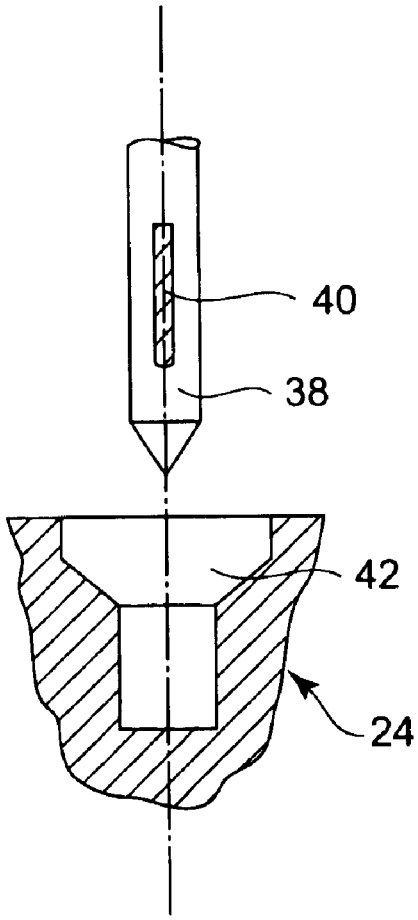
FIG. 6 is a partial section view taken substantially through a plane indicated by section line 6—6 in FIG. 5.

Projecting centrally from the underside of the support 26 of the attachment device 22 as shown in FIGS. 1, 2 and 4, is an attachment spike 38 having engagement latches 40 projecting laterally therefrom. The spike 38 will accordingly be received within a reception funnel 42 formed in the boat receptacle 24, as shown in FIG. 6, so as to effect attachment therewith when lowered by the crane 10 into engagement.

Figure 5:
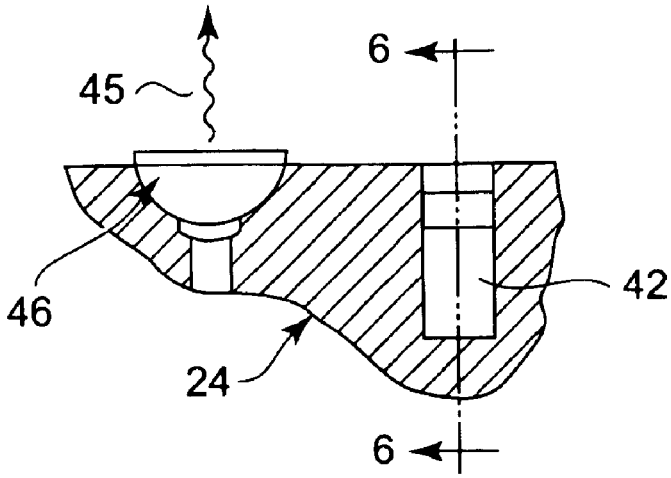
FIG. 5 is a partial section view taken substantially through a plane indicated by section line 5—5 in FIG. 2.
Figure 7:
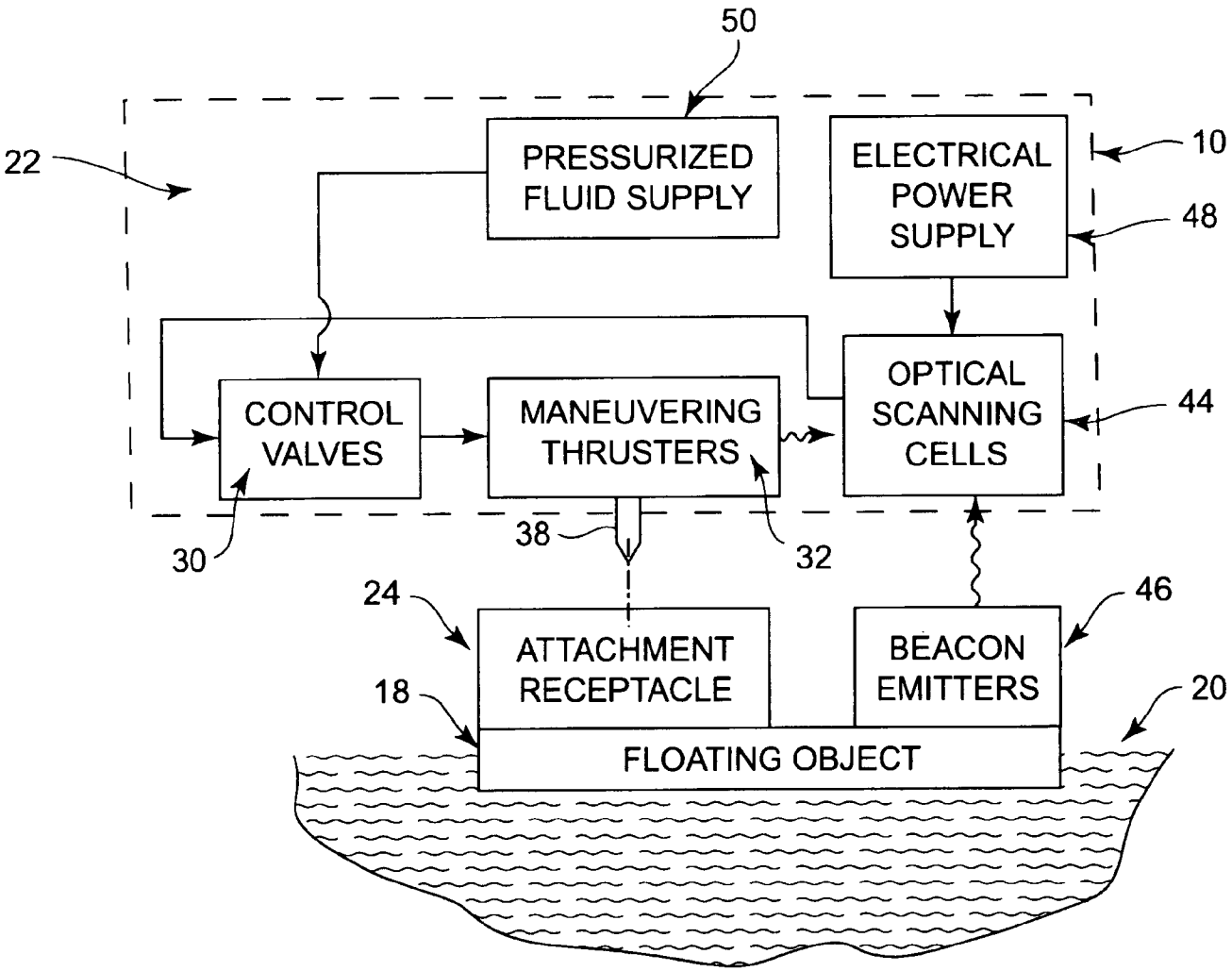
FIG. 7 is a schematic diagram of the automatic optical housing maneuvering system associated with the shipboard hoisting crane arrangement illustrated in FIGS. 1–6.

Also mounted within the support 26 of the attachment device 22 for exposure on its underside as shown in FIGS. 2, 4 and 5, are four (4) photoelectric optical detection cells 44 for tracking beacons 45 emitted from the receptacle 24 by beacon emitters 46 to scan movement of the boat 18. The receptacle location indicating beacon 45 from the emitter 46 when scanned by the cells 44 will accordingly produce maneuvering signals that are applied to the thruster control valves 30 as diagrammatically shown in FIG. 7. The thrust homing control system associated with the attachment device 22, accordingly includes an electrical power supply 48 for operationally energizing the scanning cells 44 through which selected ones of the control valves 30 are opened and closed to feed pressurized fluid from a pressurized fluid supply 50 for directionally controlled discharge of the jet 34 from the maneuvering thruster cones 32 in order to impart positioning alignment motion to the attachment device 22.

As a result of the foregoing described thruster guidance, the operator of the shipboard crane 10 may quickly maneuver the crane end section 16 for its attachment through the device 22 to the receptacle 24 on the boat 18 floating alongside the ship 14 under high sea states. The attachment device 22 is reeled up by the crane 10 causing the boat 18 to be pulled up against the end section 16 of the crane 10 so as to stabilize the boat 18 while being brought aboard the vessel 12. Toward that end, the crane end section attachment device 22 is provided with the scanning cells 44 on its support 26 to track movement of the floating object 18 and thereby selectively control powering of the thrusters 32 to synchronize motion of the attachment crane end section 16 and attachment device 22 with the seawater imposed motion of the floating object 18.

Pursuant to the present invention, the directional thrust effected by discharge 34 from the cones 32 may be produced by pressured fluids other than those from pressurized air or water supplies, such as propane and rocket thrusters. Also, multiple directed fans or propellers may be utilized as the thrusters. Furthermore, the attachment configuration involving the locations of the spike 38 and the funnel 42 respectively on the attachment crane end section 22 and the boat mounted receptacle 24 may be reversed.

Obviously, other modifications and variations of the present invention may be possible in light of the foregoing teachings. It is therefore to be understood that within the scope of the appended claims the invention may be practiced otherwise than as specifically described.

What is claimed is:

1. In combination with a sea vessel hoisting crane having a load pick-up and delivery end section suspended therefrom to be received within a receptacle positioned on a boat afloat in seawater, a system for controlled displacement of the crane end section while being lowered toward said receptacle above the seawater, comprising: optical detection means for generation of maneuvering signals transmitted only above the seawater in response to said movement of the receptacle relative to the crane; and thrust means for imparting said displacement to the crane end section to maintain alignment thereof with the receptacle in response to said maneuvering signals from the optical detection means during said movement of the receptacle.

2. The combination as defined in claim 1, wherein said optical detection means comprises: radiation means on the receptacle for emission of a location-indicating beacon therefrom; and scanner means on the crane end section for effecting said generation of the maneuvering signals under selective control of the location-indicating beacon.

3. The combination as defined in claim 2, wherein said thrust means comprises: a plurality of fluid jet emitting devices mounted in angularly spaced relation to each other; and valve means connecting said fluid jet emitting devices to a source of pressurized fluid under control of the maneuvering signals to impart said displacement to the crane end section in response to fluid jet discharges from the fluid jet emitting devices.

4. The combination as defined in claim 3, wherein said crane end section comprises: a support on which the optical detection means and the thrust means are mounted; and an attachment spike projecting from the support to be received within a reception funnel formed in the receptacle at a predetermined reception location thereon.

5. The combination as defined in claim 1, wherein said thrust means comprises: a plurality of fluid jet emitting devices mounted in angularly spaced relation to each other; and valve means connecting said fluid jet emitting devices to a source of pressurized fluid under control of the maneuvering signals to impart said displacement to the crane end section in response to fluid jet discharges from the fluid jet emitting devices.

6. The combination as defined in claim 1, wherein said crane end section comprises: a support on which the optical detection means and the thrust means are mounted; and an attachment spike projecting from the support to be received within a reception funnel formed in the receptacle at a predetermined reception location thereon.

* * * * *